(12) United States Patent
Cook et al.

(10) Patent No.: US 7,337,865 B2
(45) Date of Patent: Mar. 4, 2008

(54) ARRANGEMENT FOR PASSAGE CONTROL OF MINE VEHICLES

(75) Inventors: Brett Cook, Turku (FI); Jukka Kollanus, Pirkkala (FI); Jarmo Puputti, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 304 days.

(21) Appl. No.: 10/551,790

(22) PCT Filed: Apr. 2, 2004

(86) PCT No.: PCT/FI2004/000207

§ 371 (c)(1), (2), (4) Date: Oct. 3, 2005

(87) PCT Pub. No.: WO2004/088092

PCT Pub. Date: Oct. 14, 2004

(65) Prior Publication Data

US 2006/0249321 A1    Nov. 9, 2006

(30) Foreign Application Priority Data

Apr. 4, 2003    (FI)    ................... 20030514

(51) Int. Cl.
*B60D 1/28* (2006.01)

(52) U.S. Cl. ..................................... 180/271

(58) Field of Classification Search ................ 180/271, 180/287, 168
See application file for complete search history.

(56) References Cited

U.S. PATENT DOCUMENTS 6,470,989 B1    10/2002    Puputti et al.
2006/0158017 A1*    7/2006    McKenzie ................. 299/1.7

FOREIGN PATENT DOCUMENTS

GB    2 124 798    2/1984
WO    01/88827    11/2001

* cited by examiner

*Primary Examiner*—Paul N. Dickson
*Assistant Examiner*—Drew J. Brown
(74) *Attorney, Agent, or Firm*—Drinker Biddle & Reath LLP

(57) ABSTRACT

A method, system and access station for passage control of mine vehicles. Mine vehicles are transferred between an operation area and a manual area through one or more access stations between which there is an intermediate space, to which the mine vehicle to be transferred can be driven. When the mine vehicle is in the intermediate space, at least one access gate is closed.

9 Claims, 4 Drawing Sheets

ARRANGEMENT FOR PASSAGE CONTROL OF MINE VEHICLES

BACKGROUND OF THE INVENTION

The invention relates to a method for passage control of an unmanned mine vehicle, the method comprising: limiting in a mine at least one predefined operation area where one or more unmanned mine vehicles operate; and preventing unallowed access of the unmanned mine vehicle to a manual area limited outside the operation area.

The invention also relates to a passage control system of a mine, the system comprising: at least one operation area for at least one unmanned mine vehicle; at least one gate for preventing unallowed access of the unmanned mine vehicle to a manual area outside the operation area; and means for opening and closing the gates limiting free access of mine vehicles.

The invention further relates to a passage station for mine vehicles, the passage station comprising at least one gate, which is arranged in a mine between an operation area limited for unmanned mine vehicles and a manual area limited outside the operation area, and through which passage station the mine vehicle is arranged to be transferred from the operation area to the manual area and vice versa.

Automatic and other unmanned mine vehicles have been provided for use in modern mines, which vehicles can be controlled by remote control from a control room, for instance. The purpose is to improve the safety of workers and the working conditions as well as to increase productivity. When unmanned and automatic devices are used, safety factors must be carefully considered. Also, the law requires that safety systems, such as passage control, are used in mine systems comprising such vehicles. Typically, unmanned mine vehicles have an isolated operation area, to which outsiders or unauthorized vehicles cannot access, in order to eliminate the risk of collision. The operation area can be limited by arranging, for instance, booms or other similar boundaries in a mine. In connection with the boundaries there are sensors which monitor the crossing of each boundary. Crossing of a boundary causes a warning signal, which is arranged to stop the entire automatic mine system in the operation area and the mine vehicles therein. Thus, whenever a mine vehicle is brought to an operation area or removed therefrom, the entire system and production will stop.

BRIEF DESCRIPTION OF THE INVENTION

It is an object of the invention to provide a new and improved method, system and passage station for passage control of mine vehicles.

The method of the invention is characterized by transferring the mine vehicle from the operation area to the manual area or vice versa through at least one passage station, the passage station being arranged between the operation area and the manual area; performing the transfer of the mine vehicle in the passage station through a first access gate and a second access gate and further through an intermediate space between the access gates; and, during the transfer of the mine vehicle, keeping at least one access gate closed at a time.

The system of the invention is characterized in that the system comprises at least one passage station, which is arranged between the operation area and the manual area and through which the mine vehicle is arranged to be transferred from the operation area to the manual area and vice versa; that the passage station comprises two openable and closable access gates arranged successively at a distance from each other; that the first access gate is in the operation area side and the second access gate is in the manual area side; that there is an intermediate space between the first access gate and the second access gate; and that the passage control system is arranged to control the passage station so that when the mine vehicle is in the intermediate space, at least one access gate is closed.

The passage station of the invention is characterized in that the passage station comprises two openable and closable access gates arranged successively at a distance from each other; that the first access gate is in the operation area and the second access gate is in the manual area; that between the first access gate and the second access gate there is an intermediate space, to which the mine vehicle can be driven through an access gate; and that the passage station comprises at least one control device, which is arranged to control the passage station so that when the mine vehicle is in the intermediate space, at least one access gate is closed.

The essential idea of the invention is that an unmanned mine vehicle is transferred from an operation area limited for it to a manual area via a passage station. The passage station comprises two successive access gates, which can be opened and closed. Between the access gates there is an intermediate space, to which the mine vehicle to be transferred can be driven. When the mine vehicle is driven to or from the intermediate space, one access gate is open and the other is closed.

The invention provides the advantage that mine vehicles can be taken safely to and from a limited operation area formed for unmanned mine vehicles without having to stop the operation of other mine vehicles in the operation area. Due to the invention, mine vehicles which are in the operation area can be taken to be serviced or repaired without stopping the operation of the system. Furthermore, new mine vehicles can be brought to the operation area, if necessary, and unnecessary mine vehicles can be removed without trouble.

The essential idea of an embodiment of the invention is that an unmanned mine vehicle is driven unmanned from an operation area to an intermediate space. The mine vehicle is switched off and switched to manual mode. Thereafter, a driver drives the mine vehicle manually from the intermediate space to the manual area. When the mine vehicle is transferred from the manual area to the operation area, the transfer from the manual area to the intermediate space is carried out manually. After this, the driver leaves the intermediate space and the mine vehicle is driven unmanned from the intermediate space to the operation area.

BRIEF DESCRIPTION OF THE FIGURES

The invention will be described in greater detail in the attached drawings, in which FIG. 1 schematically shows a section of a mine provided with a passage control system of the invention, FIG. 2 schematically shows a side view of a mine vehicle, FIG. 3 schematically shows a gate of a passage station of the invention from the direction of travel of the mine vehicle, FIGS. 4, 5 and 6 schematically show top views illustrating the operational principle of a passage station of the invention, and FIG. 7 schematically shows a gate of the passage station from the direction of travel of the mine vehicle.

For the sake of clarity, the figures show the invention in a simplified manner. Like parts are designated by like reference numerals.

DETAILED DESCRIPTION OF THE INVENTION

Figure 1:
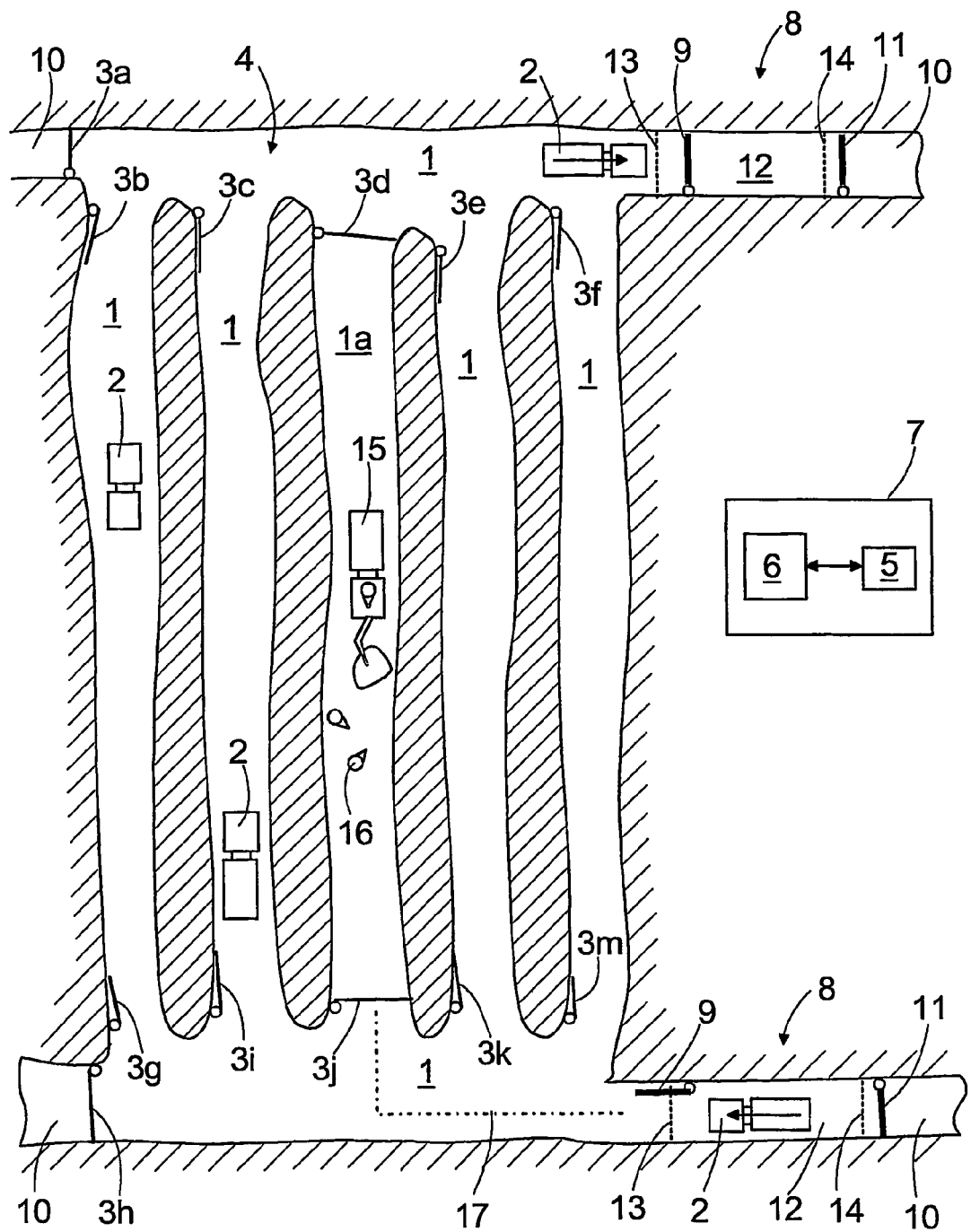

FIG. 1 shows a section of a mine. The mine comprises several mine tunnels 1 where mine vehicles 2 can operate. By using of boundary gates 3a to 3m, an operation area 4 can be limited in a mine, where mine vehicles can be driven safely as unmanned. Mine vehicles operating in other sections of the mine are not allowed to access to this limited operation area 4. People do not have free access to the operation area 4 either. The access to the operation area can be monitored by means of a passage control system 5. The passage control system 5 and a control system 6 of mine vehicles can form a part of a control system 7 of the entire mine. The passage control system 5 comprises at least one access station 8 allowing mine vehicles 2 to be taken to and from the operation area 4 without having to stop other mine vehicles 2 operating in the operation area 4. The number of access stations 8 required depends, for instance, on the size of the operation area 4 and the number of mine vehicles 2 operating in the operation area 4. Seen in the direction of travel of the mine vehicle, the passage station 8 comprises two successive access gates, i.e. a first access gate 9 in the operation area side 4 and a second access gate 11 in a manual area side 10. There is an intermediate space 12 between the first access gate 9 and the second access gate 11. The passage control system 5 of the mine control system 7 can be arranged to control the operation of the access gates 9, 11. The passage station 8 can also comprise a first detection point 13 in the operation area 4 before the first access gate 9 and, correspondingly, a second detection point 14 in the intermediate space 12 before the second access gate 11. The operation of the passage station 8 is illustrated in more detail in the description of FIGS. 4, 5, and 6.

As FIG. 1 shows, there can be a plurality of boundary gates 3a to 3m, which can be situated as desired in different sections of the mine. Gates 3 can be positioned in the mine in such a manner that the access of unmanned mine vehicles to specific mine sections or mine tunnels 1 can be prevented. In FIG. 1, for instance, a tunnel 1a is isolated by means of gates 3d and 3j as a safety area, to which the unmanned mine vehicles cannot access. Thus, the safety area 1a does not belong to the operation area 4. In the safety area 1a, manual operations, such as service, repair and measurement operations, can be carried out. The passage control system 5 can be arranged to open and close gates 3a to 3m by remote control.

By utilizing gates 3a to 3m, it is also possible to provide a safety path 17 from the passage station 8 to the safety area 1a. Thus, manual mine vehicles 15 as well as the necessary people 16 can be transported safely to the safety area 1a without having to stop the operation of the unmanned mine vehicles 2 in the operation area 4. A safety path 17 is illustrated by a dot-and-dash line in FIG. 1. In this case, the gates 3g, 3h, 3i, 3k and 3m are closed and the gate 3j is open.

Figure 2:
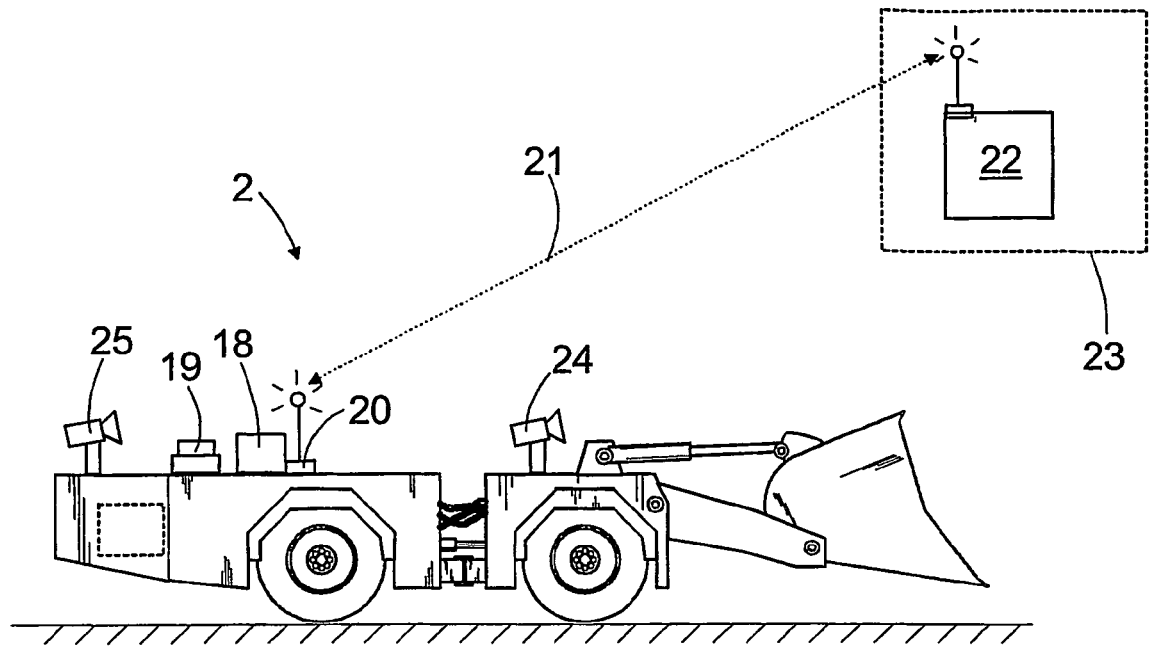

FIG. 2 shows a mine vehicle 2, which can be driven unmanned in the operation area 4 of the mine. In this case, the mine vehicle 2 is a loading vehicle, but it can also be another vehicle used in the mine, such as a measuring vehicle, a rock drilling rig, a charging vehicle or a transport vehicle. The mine vehicle 2 comprises a control unit 18 for controlling the mine vehicle 2. Furthermore, the mine vehicle 2 can comprise navigation equipment 19 for determining the position and the direction. The mine vehicle 2 can also comprise a data transmission unit 20 for establishing a data transmission connection 21 between the control unit 18 of the mine vehicle 2 and at least one external control unit 22. Thus, control commands can be transmitted, for instance, from a control room 23 to the mine vehicle. When, for example, electrically driven mine vehicles are used, the data transmission connection 21 can be wired. The data transmission connection can also be wireless, e.g. a system based on radio frequency. Furthermore, it is possible that an operator controls the mine vehicle 2 by remote control from an external control room 23, for instance. Control commands are transmitted to the mine vehicle by using a data transmission connection 21. For teleoperation, the operator can be provided with image information provided by a camera 24 arranged in the mine vehicle, and also with other information for controlling and steering a mine vehicle 2, provided by laser scanners 25, sensors and the like, for instance. The mine vehicle 2 can also be driven automatically in the mine along a predefined route, e.g. from a loading site to a dumping site. This route can be formed by teaching, for instance. Also, an electronic map of the mine can be utilized in the automatic drive. Depending on the situation and the mine, the above control methods can be combined. As shown above, there are several alternative technologies and methods for positioning and controlling an unmanned mine vehicle 2 in a mine.

Figure 3:
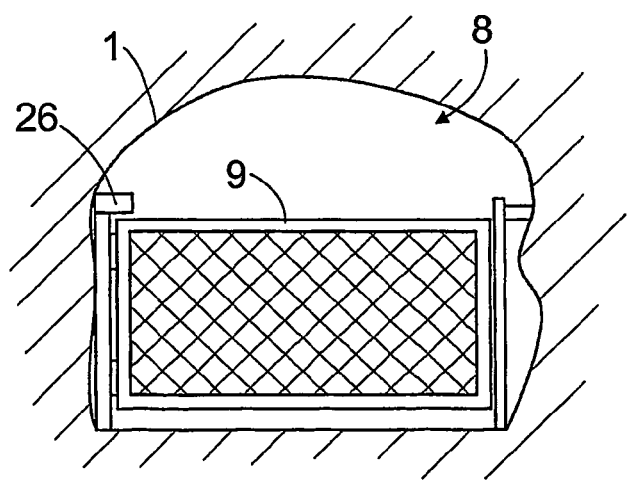

FIG. 3 is a great simplification of a gate structure, which can be used as an access gate 9, 11 of a passage station 8. Such a gate can also be applied as a boundary gate 3a to 3m for limiting an operation area 4. The construction of the gate 9 can be such that it forms a physical barrier to mine vehicles 2. The gate 9 can also be dimensioned in such a manner that it can stop the mine vehicle 2 if the mine vehicle 2 drives against the gate 9 for some reason. In its simplest, the gate is a boom whose one end comprises hinges for opening and closing it. Furthermore, the structure of the gate 9 can be such that people cannot pass by the gate 9 at all, or at least without using considerable effort, unless they open it. At the gate 9 there is a moving apparatus 26, by which the gate 9 can be opened and closed. The moving apparatus 26 can be controlled by a control device of the passage control system 5.

Figure 4:
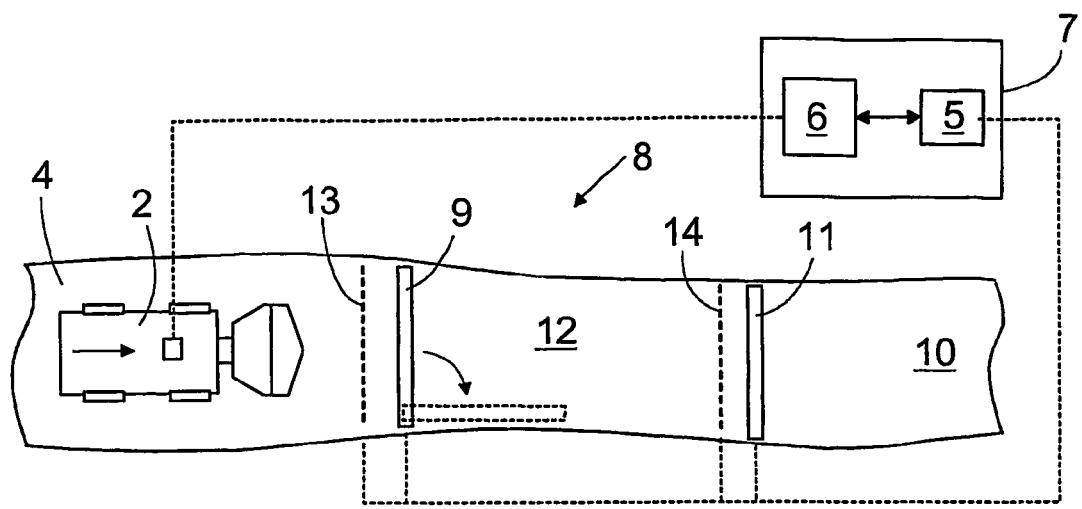
Figure 5:
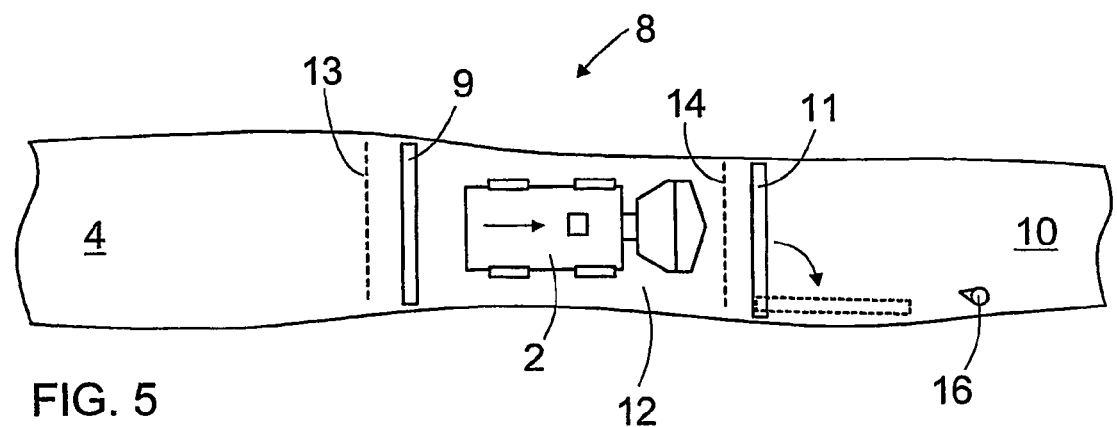
Figure 6:
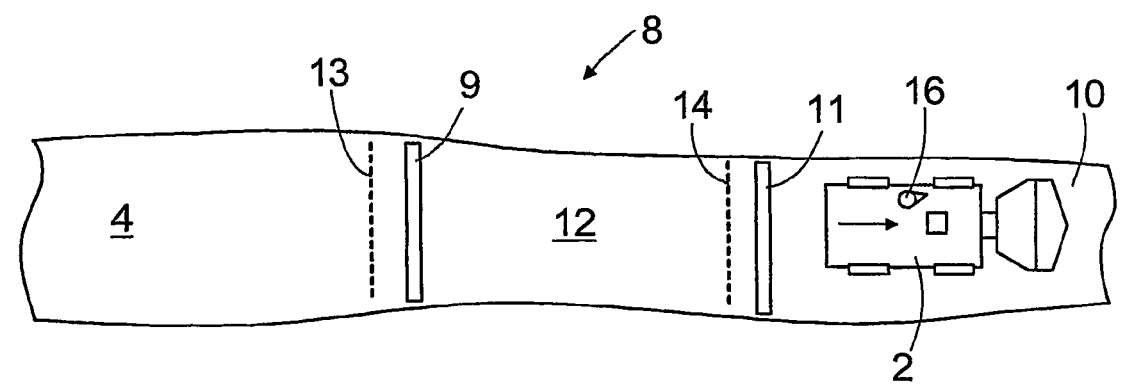

FIGS. 4 to 6 illustrate the structure and operational principle of a passage station 8 of the invention. The passage station 8 comprises two openable and closable access gates 9, 11, which are arranged successively at a predefined distance from each other. The first access gate 9 is in the operation area 4 limited for unmanned and automatic mine vehicles 2 and the second access gate 11 is in the manual area 10 intended for manual driving. Between the access gates 9, 11 there is an intermediate space 12, which is dimensioned in such a manner that the mine vehicles 2 to be used in the operation area 4 fit in the intermediate space 12 when the access gates 9, 11 are closed. The access gates 9 and 11 are kept closed and they are opened only when mine vehicles 2 need to be transferred between the operation area side 4 and the manual area side 10. Thus, the passage station 8 also limits the operation area 4. Further, the operation of the access gates 9 and 11 is arranged in such a manner that only one gate can be open at a time. Only when the mine system is out of operation, both access gates 9, 11 can be simultaneously open manually.

Next, the operation of the passage station 8 is described in a situation where an unmanned mine vehicle 2 needs to be removed from the operation area in order to service it, for instance. The control system 6 gives the mine vehicle 2 a control command to move to a defined access station 8. After receiving the control command, the mine vehicle 2 finishes its current operation or, depending on the situation, interrupts its operation and moves towards the passage station 8. It can be transferred to the passage station 8 by remote control along a pre-taught route, for instance. As the mine vehicle 2 approaches the passage station 8, the passage control system 5 can open the first access gate 9. In front of the first access gate 9 there is at least one first detection point 13, e.g. a photocell, the purpose of which is to detect the mine vehicle 2 when it approaches the passage station 8. If problems arise during the mine vehicle 2 approach or while opening the access gate 9, the detection point 13 detects the approaching mine vehicle 2 and can send a message to the control system 6. If necessary, the control system 6 can perform an emergency stop of the mine vehicle 2 before collision. There may be a similar, second detection point 14 in front of the second access gate 11. As FIG. 5 shows, the mine vehicle 2 can be driven unmanned to the intermediate space 12 of the passage station 8. After this, the first access gate 9 is closed. Thereafter, the operation of the mine vehicle 2 is switched off. The second access gate 11 of the passage station 8 can now be opened and a driver 16 can get on the mine vehicle 2 in the intermediate space 12 and switch it to manual mode and drive the mine vehicle 2 manually away from the passage station 8 to the manual area 10. After this, the second access gate 11 can be closed. The second access gate 11 can be used manually by control means of the passage control system 5.

When the mine vehicle 2 is transferred from the manual area 10 to the operation area 4, the above steps take place in reverse order. The second access gate 11 is opened manually, after which the driver 16 drives the mine vehicle 2 manually to the intermediate space 12. The driver 16 leaves the intermediate space, closes the second access gate 11 and switches the control system 6 and the passage control system 5 to automatic mode. Thereafter, the mine vehicle 2 makes the necessary arrangements for automatic drive. The passage control system 5 opens the first access gate 9, whereafter the mine vehicle 2 leaves the passage station and proceeds towards a defined work site. Finally, the first access gate 9 is closed.

The passage control system 5 can also comprise other safety devices and arrangements. Various cameras and sensors can be used for ensuring that there are no people 16 in the intermediate space 16 when the system is switched to automatic mode. Furthermore, people 16 working in the passage station 8 can be required to indicate their position before the system is switched off from the manual drive.

Figure 7:
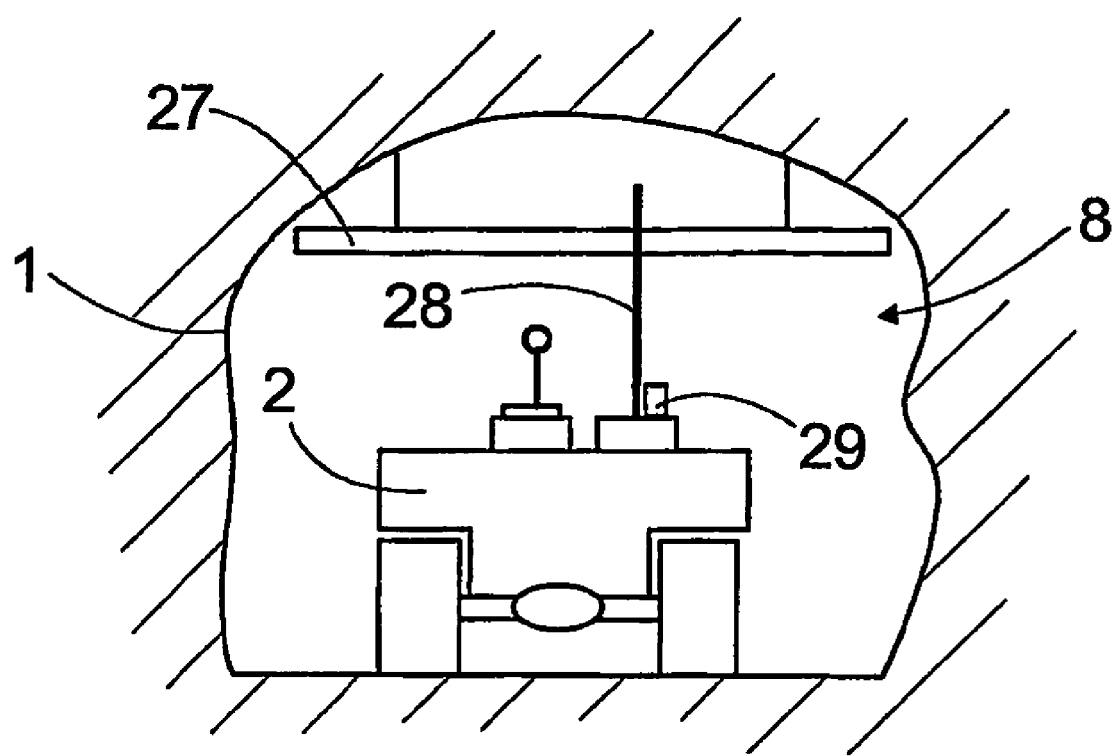

FIG. 7 shows another feasible way of controlling the access of a mine vehicle. Here the passage station is provided with a substantially horizontal boom 27, which is located higher than the top section of mine vehicles 2. Thus, the boom 27 acts as an access gate 9, 11. Each mine vehicle 2 is also provided with at least one mast 28. The mast 28 is dimensioned so that it reaches the boom 27 in the passage station 8. In connection with the mast 28 there is at least one sensor 29, which is arranged to switch off the mine vehicle 2 and/or give a signal to the control system and the passage control system 5 when the mast 28 hits the boom 27. Another alternative is that one or more sensors 29 are arranged in connection with the boom 27 and the information is transmitted from the sensor 29 to the control system and the passage control system 5. The arrangement of FIG. 7 can be applied in addition to other gate constructions or as an alternative thereto.

In some cases, the access gate 9 and 11 can also comprise a plurality of gate sections, which can be arranged to open and close by means of a separate moving apparatus 26 and by using their support elements.

The drawings and the related description are only intended to illustrate the idea of the invention. In its details, the invention may be varied within the scope of the invention.

What is claimed is:

1. A method for passage control of an unmanned mine vehicle, the method comprising:
    limiting in a mine at least one predefined operation area where one or more unmanned mine vehicles operate;
    preventing unallowed access of the unmanned mine vehicle to a manual area limited outside the operation area,
    transferring the mine vehicle from the operation area to the manual area or vice versa through at least one access station, the passage station being arranged between the operation area and the manual area;
    performing the transfer of the mine vehicle in the passage station through a first access gate and a second access gate and further through an intermediate space between the access gates;
    and, during the transfer of the mine vehicle, keeping at least one access gate, closed at a time.

2. A method as claimed in claim 1, comprising
    continuing the operations of the mine vehicles in the operation area uninterruptedly regardless of transfers of unmanned mine vehicles in the passage station.

3. A method as claimed in claim 1, comprising
    driving the mine vehicle unmanned from the operation area to the intermediate space and, correspondingly, from the intermediate space to the operation area,
    and driving the mine vehicle manned from the intermediate space to the manual area and, correspondingly, from the manual area to the intermediate space.

4. A method as claimed in claim 1, comprising
    detecting the approach of the mine vehicle to the passage station by means of at least one detection point.

5. A passage control system of a mine, the system comprising:
    at least one operation area for at least one unmanned mine vehicle;
    at least one gate for preventing unallowed access of the unmanned mine vehicle to a manual area outside the operation area;
    means for opening and closing the gates limiting free access of mine vehicles
    at least one access station, which is arranged between the operation area and the manual area and through which the mine vehicle is arranged to be transferred from the operation area to the manual area and vice versa; and wherein
    the passage station comprises two openable and closable access gates arranged successively at a distance from each other;
    the first access gate is in the operation area side and the second access gate is in the manual area side;
    there is an intermediate space between the first access gate and the second access gate;
    and the passage control system is arranged to control the passage station so that when the mine vehicle is in the intermediate space, at least one access gate is closed.

6. A system as claimed in claim 5, wherein
    the operation of the passage station is independent of the mine vehicles operating in the operation area.

7. A system as claimed in claim 5, wherein
the mine vehicle is arranged to be transferred unmanned from the operation area to the intermediate space and, correspondingly, from the intermediate space to the operation area,
and the mine vehicle is arranged to be transferred manned from the intermediate space to the manual area and, correspondingly, from the manual area to the intermediate space.

8. A system as claimed in claim 5, the system comprises at least one detection point, which is arranged to detect the mine vehicle approaching the access gate from the operation area.

9. A passage station for mine vehicles, the passage station comprising at least one gate, which is arranged in a mine between an operation area limited for unmanned mine vehicles and a manual area limited outside the operation area, and through which access station the mine vehicle is arranged to be transferred from the operation area to the manual area and vice versa, and wherein
the passage station comprises two openable and closable access gates arranged successively at a distance from each other;
the first access gate is in the operation area side and the second access gate is in the manual area side;
between the first access gate and the second access gate there is an intermediate space, to which the mine vehicle can be driven through an access gate;
and the passage station comprises at least one control device, which is arranged to control the passage station so that when the mine vehicle is in the intermediate space, at least one access gate is closed.

* * * * *